Sept. 25, 1951     C. T. JENSEN     2,569,172

AIRPLANE MOUNTED DUST DISTRIBUTOR

Filed April 15, 1946     2 Sheets-Sheet 1

INVENTOR

C. T. Jensen

BY Webster & Webster

ATTORNEYS

Sept. 25, 1951 C. T. JENSEN 2,569,172
AIRPLANE MOUNTED DUST DISTRIBUTOR
Filed April 15, 1946 2 Sheets-Sheet 2

INVENTOR
C. T. Jensen
BY
ATTORNEYS

Patented Sept. 25, 1951

2,569,172

UNITED STATES PATENT OFFICE 2,569,172

AIRPLANE MOUNTED DUST DISTRIBUTOR

Charley T. Jensen, Sacramento, Calif.

Application April 15, 1946, Serial No. 662,113

3 Claims. (Cl. 244—136)

1

This invention relates to the art of diffusing insecticides or other character of dust from an airplane.

This type of dusting is becoming very generally practiced, but there have been found certain difficulties in properly agitating and evenly distributing the dust from the plane in order to secure the best efficiency.

It is the primary object of the present invention to provide a novel type of hopper construction which will provide for the proper agitation of the dust within the discharge portion of the hopper, will prevent bridging of the material within the hopper and will provide for a very efficient and equalized discharge of the dust from the hopper.

These objects I accomplish by a particular form of the discharge end of the hopper, and in combination therewith a very accurately controlled discharge outlet gate from the hopper.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of an airplane showing my discharge hopper thereon.

Figure 2 is a transverse sectional view of the hopper.

Figure 3 is a fragmentary bottom plan view of the hopper discharge gate showing the gate supporting rollers.

Figure 4 is a sectional view of the gate taken on a line 4—4 of Fig. 2.

Figure 5 is a fragmentary view showing the agitating element in the hopper and the manner of driving the same by a propeller driven by the air stream created by the forward movement of the airplane.

Referring now more particularly to the characters of reference on the drawings, the numeral 1 designates the airplane which may be of the usual type used in the art. Preferably in the forward portion thereof is provided the dust supply container 2 having a cap 3 through which the dust may be introduced into the container.

Below the container 2 is the discharge hopper 4 which according to my inventive concept shall be of the substantially triangular shape shown with the apex portion thereof pointing down-

2 wardly. The forward wall of this hopper 4 is solid and in the rear wall thereof is provided the gate unit 5, which is later described in detail. Journaled adjacent the apex of the hopper 4, and extending completely across the same, is the agitating wheel or reel 6. The shaft 7 of the reel 6 projects outside of the hopper 4 at one end thereof and is provided with a pinion 8. This pinion 8 is driven by a worm gear 9 mounted on the shaft 10 of a small propeller 11 which faces into the air stream created by the forward movement of the plane and is driven thereby.

A plurality of transversely spaced, longitudinal rails 12 are supported from the rear wall of the hopper 4 in spaced relation thereto and extend in substantial parallelism therewith for the full length of said rear wall of the hopper 4. The rear wall of the hopper 4, adjacent its lower end, is provided with a discharge opening 13 normally closed by a gate 14. This gate has a plurality of lugs 15 projecting outwardly from its outer surface and in substantial alinement with each of the rails 12. A longitudinal roller frame 16 is pivoted intermediate its ends in each lug 15, and in each outer end of each frame 16 is journaled a flanged roller 17 adapted to ride the adjacent rail 12.

Adjacent each end of each frame 16 and interposed between it and the gate 14 is an adjustment screw 18 having a pad 19 engaging the gate 14. On each screw 18 is an adjustment nut 20 through the medium of which the pad 19 may be finely adjusted so that the gate 14 may have a very positive contact with a sealing gasket 21 interposed between the peripheral edges of the gate 14 and the peripheral edges of the opening 13. The gasket 21 is preferably made of some wear-resistant material.

The rails 12 are adjustably mounted at the ends, as at 12*a*, so that said rails can be set for proper tracking of the corresponding roller frames 16.

On the gate 14 is a pull rod 22 which leads to a position adjacent the operator's seat in the airplane so that the opening and closing of the easily slidable gate may be readily controlled.

*Operation*

With the forward movement of the plane, the agitating reel 6 will be rotated at a point where it will keep the dust immediately adjacent the outlet 13 in a state of proper agitation. Through the medium of the delicately adjusted door mechanism the control of the discharge of the dust may be such as to allow of the desired distribution thereof with a great deal of finesse on the part of the operator and without any possibility of the door sticking in a manner to cause the dust to be discharged in anything but properly diffused condition. It is to be understood that the action of a duster of this character is very rapid when brought into play and anything which tends to impede the quick outlet of the dust or to allow the same to be discharged in other than very finely diffused relation very greatly impairs the effectiveness of the dusting process.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In an airplane having a dust container, a discharge hopper below and in communication with the container, said hopper including a flat rear wall sloping upwardly from its forward end and having an outlet opening extending rearwardly from the lower forward end thereof, a flat slide gate parallel to and below the plane of the opening and movable lengthwise thereof to open and close the opening, means connected to the gate to slide the same and control its position relative to the outlet opening and gate supporting means which includes transversely spaced rails suspended from and substantially parallel to the rear wall and below the gate, roller frames extending lengthwise of and mounted on and under the gate above the rails, and rollers mounted in said frames adjacent their ends and riding the corresponding rails.

2. A structure as in claim 1, in which the roller frames are pivoted intermediate their ends on the gate, and adjustment means between each frame at its ends and the gate to adjust such frame relative to the gate while maintaining said frame rigid with the gate in any adjusted position.

3. A structure as in claim 1, with a gasket secured on said rear wall about the periphery of the opening, said gasket at the sides extending rearwardly from the opening for uninterrupted contact with the gate when the latter is opened.

CHARLEY T. JENSEN.

REFERENCES CITED

The following references are of record in the file of this patent:

UNITED STATES PATENTS

| Number | Name | Date |
| --- | --- | --- |
| 325,016 | Ryan | Aug. 25, 1885 |
| 433,009 | Lane | July 29, 1890 |
| 729,266 | Brenzinger | May 26, 1903 |
| 854,564 | Bullard | May 21, 1907 |
| 1,029,431 | Elliott et al. | June 11, 1912 |
| 1,057,769 | Pearson | Apr. 1, 1913 |
| 1,459,955 | Johnson | June 26, 1923 |
| 1,602,339 | Davidson | Oct. 5, 1926 |
| 1,653,631 | Kirkland | Dec. 27, 1927 |
| 1,673,087 | Morse | June 12, 1928 |
| 1,691,205 | Morse | Nov. 13, 1928 |
| 1,703,308 | Johnson | Feb. 26, 1929 |
| 1,722,467 | Huff | July 30, 1929 |
| 1,907,144 | Brady | May 2, 1933 |
| 2,427,987 | Wilson | Sept. 23, 1947 |

FOREIGN PATENTS

| Number | Country | Date |
| --- | --- | --- |
| 23,869 | Great Britain | of 1910 |